United States Patent [19]

Dickerson

[11] Patent Number: 4,680,690
[45] Date of Patent: Jul. 14, 1987

[54] INVERTER FOR USE WITH SOLAR ARRAYS

[76] Inventor: Arthur F. Dickerson, 245 Hacienda Ave., San Luis Obispo, Calif. 93401

[21] Appl. No.: 866,863

[22] Filed: May 23, 1986

Related U.S. Application Data

[63] Continuation-in-part of Ser. No. 662,783, Oct. 19, 1984, Pat. No. 4,591,965.

[51] Int. Cl.$^4$ ............................................. H02M 1/12
[52] U.S. Cl. ........................................ 363/43; 363/97; 323/906
[58] Field of Search .................. 363/40, 43, 97, 98, 363/131, 132; 323/906; 307/260

[56] References Cited

U.S. PATENT DOCUMENTS

| | | | |
|---|---|---|---|
| 3,118,105 | 1/1964 | Relation et al. | 363/40 |
| 3,416,062 | 12/1968 | Bernhard et al. | 363/40 |
| 3,867,643 | 2/1975 | Baker et al. | 363/43 X |
| 4,052,657 | 10/1977 | Kleiner et al. | 363/43 |
| 4,052,658 | 10/1977 | Hucker | 363/43 |
| 4,476,520 | 10/1984 | Gallemore | 363/43 |

Primary Examiner—Patrick R. Salce
Assistant Examiner—Judson H. Jones
Attorney, Agent, or Firm—Daniel C. McKown

[57] ABSTRACT

A controlled switching system for converting the output of several photovoltaic solar arrays into a polyphase alternating electric current. Each array is utilized 100% of the time, and at any particular instant only one array or no array is feeding a particular phase. The specific line to which an array is connected is altered in a cyclic manner by the switching system to synthesize the polyphase current. Energy is not stored in the switching system, but instead is made available as polyphase electric current as soon as it is generated by the photovoltaic arrays. Each phase approximates a sine wave to an extent that is limited by the number of arrays. For the closest approximation, the arrays must be configured to have prescribed voltages and currents. Alternatively, a single array may be partitioned electrically in such a way that the desired voltages and currents are attained.

2 Claims, 19 Drawing Figures

FIG. 5
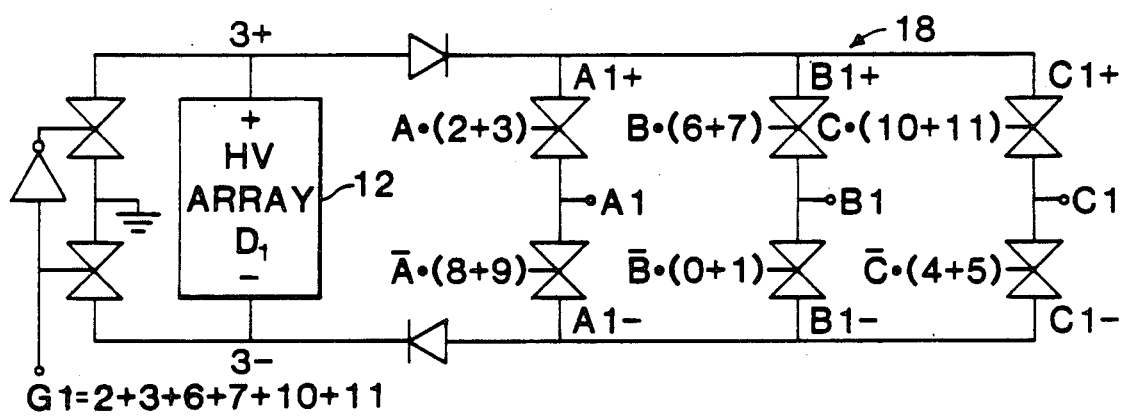
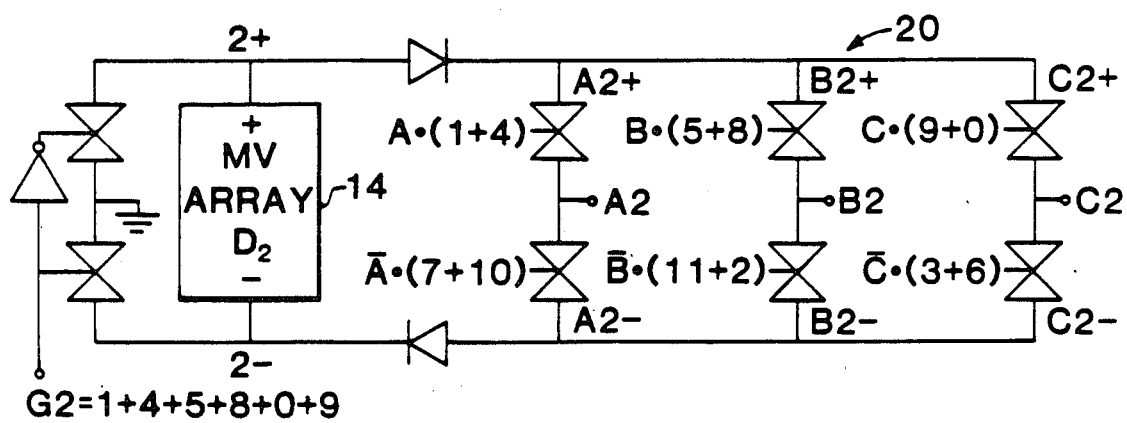
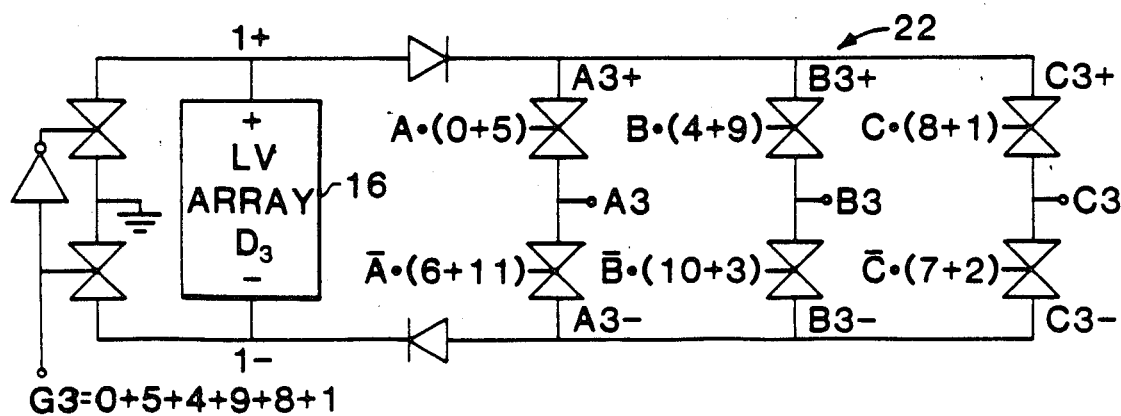

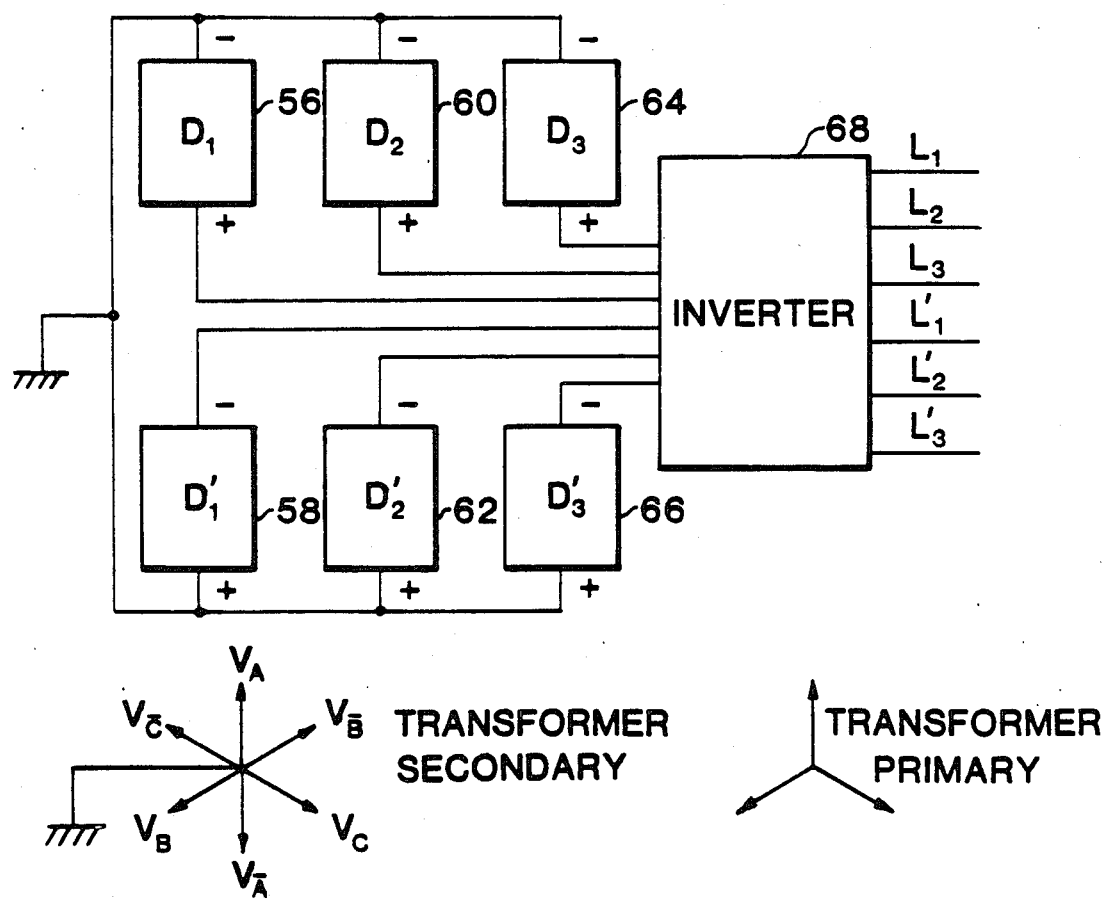

FIG. 14
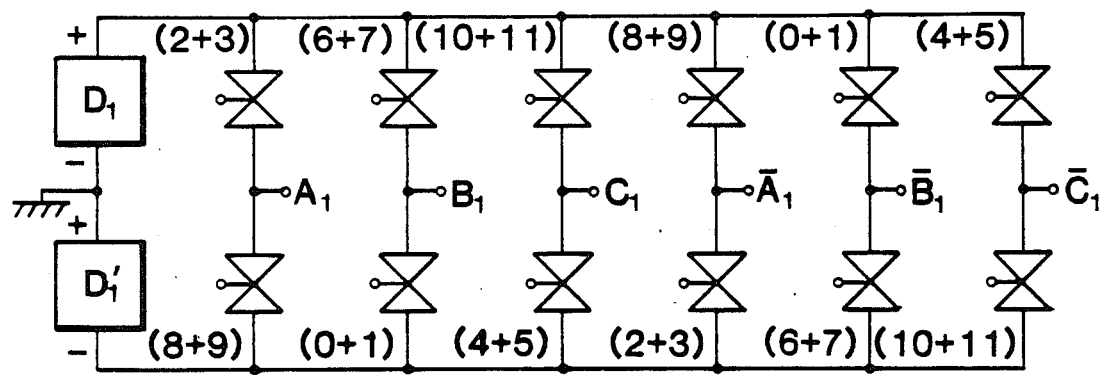
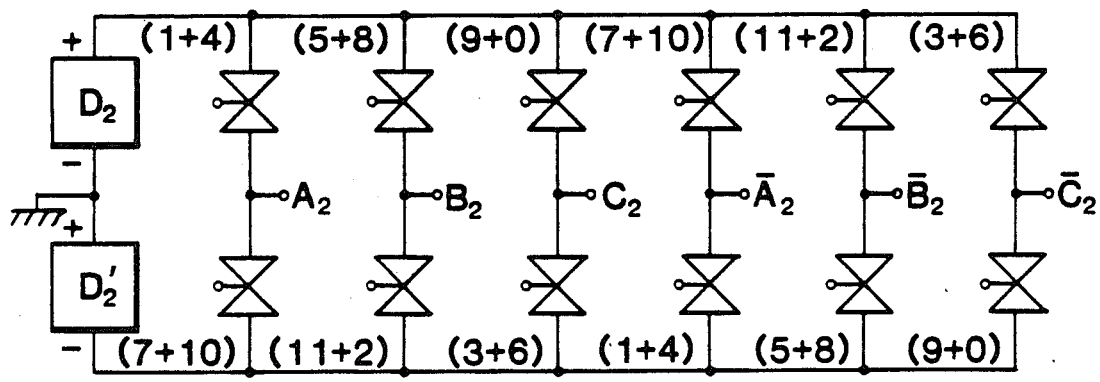
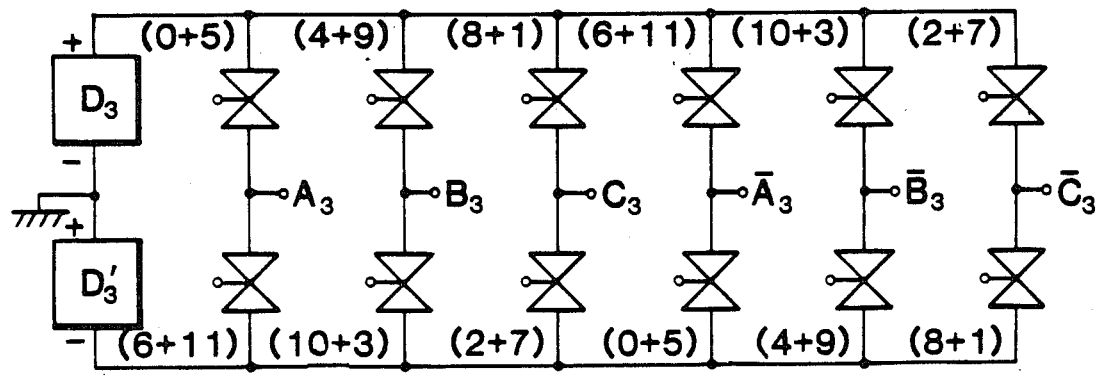

| $L_1$ | $L_2$ | $L_3$ | $L_4$ | $L_5$ | $L_6$ |
|---|---|---|---|---|---|
| A | B | C | $\bar{A}$ | $\bar{B}$ | $\bar{C}$ |

INVERTER FOR USE WITH SOLAR ARRAYS

CROSS REFERENCE TO COPENDING APPLICATION

This application is a continuation-in-part of U.S. patent application Ser. No. 662,783, filed Oct. 19, 1984 by Arthur F. Dickerson, and to be issued May 27, 1986 as U.S. Pat. No. 4,591,965.

BACKGROUND OF THE INVENTION

1. Field of the Invention

The present invention is in the field of inverters, and more specifically relates to an inverter particularly well adapted for converting the direct current generated by several solar arrays to a polyphase electrical current.

2. The Prior Art

In U.S. Pat. No. 3,867,643 issued Feb. 18, 1975 to Baker, et al., there is shown a programmed switching system for converting direct current into alternating current. The system employs a number of stages that are connected in series. Each stage includes a voltage source, such as a battery, and by switching, various combinations of voltages are added together. The current from each source is discontinous rather than continous as in the present invention. Further, because the voltage sources are connected in series, it is not possible to ground each of the sources, as in the present invention.

In U.S. Pat. No. 3,889,174 issued June 10, 1975 to Corry, there is shown apparatus for generating waveforms that have flat tops that extend over an interval greater than 60 electrical degrees. It can be shown that such a system requires the use of batteries as a primary source of energy. The energy is not removed from the batteries in a constant flow, and so the circuit disclosed would not be appropriate for use with solar panels.

In U.S. Pat. No. 4,052,657 issued Oct. 4, 1977 to Kleiner, et al., a circuit is shown in which power from two or more DC sources is inverted to produce two alternating current sources that are coupled to the load in a manner that causes their output voltages to be summed vectorially across the load. The resulting power source has a low impedance, which is the opposite result from that achieved in the present invention.

In U.S. Pat. No. 4,238,820 issued Dec. 9, 1980 to Naaijer, there is shown an inverter that synthesizes an alternating voltage by combining a number of direct current voltage sources in series combinations, which is contrary to the approach taken in the present invention.

In U.S. Pat. No. 4,424,557 issued Jan. 3, 1984, Steigerwald discloses the use of a phase locked loop for synchronizing the alternating current derived from a solar array through the use of an inverter with the current flowing in a utility grid. Steigerwald also shows the use of inductors and capacitors in the output of the inverter.

In U.S. Pat. No. 3,391,323 issued July 2, 1968 to Ikeda there is disclosed an inverter in which the current flow from each source is discontinuous, thereby rendering the system inappropriate for use with photovoltaic solar arrays. The voltage sources are connected in series, making it impossible to ground each source, as is done in the present invention.

SUMMARY OF THE INVENTION

The present invention includes an inverter for converting the direct current produced by several photovoltaic solar arrays to a polyphase alternating current.

In a preferred embodiment, the inverter of the present invention includes switching means for connecting the terminals of the solar panels to the output lines intermittently in a predetermined cyclical sequence, and also includes control means for establishing the cyclical sequence and for applying signals to the switching means to produce the desired result.

In the preferred embodiment, the output of each array is utilized 100% of the time. At any particular time, either one array or no array is directly feeding a particular alternating current line of the inverter.

In accordance with the present invention, no energy storage devices, such as batteries or capacitors, are used. Instead, the output direct current of each array is fed directly and continously to an alternating current output line.

In order to produce on each output line a waveform that approximates a sinusoid, it is necessary in accordance with the present invention to provide solar arrays that have different output characteristics. Ordinarily, this is no problem. On the contrary, each array is continously operated near its maximum power point, which is the combination of output current and voltage that results in maximum power.

Because the outputs of the arrays are not added, as they are in some prior art systems, it is possible in the preferred embodiment of the present invention to ground each of the arrays, and this is highly beneficial from the standpoint of safety.

In the preferred embodiment the losses in the switching poles are reduced from that of competing schemes as the number of switching devices in series at any instant is effectively halved.

In one application of the present invention, the polyphase output current is coupled to a utility grid through a transformer for the purpose of powering loads at remote points. In accordance with this aspect of the invention, means are provided for synchronizing the output current produced with the alternations of the voltage in the power grid. In other applications, the polyphase output of the inverter is applied to power a local independent load, such as an electrically-driven water pump.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is a circuit diagram of a first embodiment of the inverter of the present invention;

FIG. 12 is a block diagram showing the preferred embodiment of the present invention;

FIG. 14 is a circuit diagram of the preferred embodiment of the inverter of the present invention;

DETAILED DESCRIPTION OF THE PREFERRED EMBODIMENT

In this section, attention will be given to a relatively simple first embodiment for the production of three phase alternating current from either three or two or one solar array. Thereafter, with the first embodiment as a background, the preferred embodiment of FIGS. 12 and 13 will described; the preferred embodiment uses six arrays to produce six phases in a grounded double-wye connection.

Figure 1:
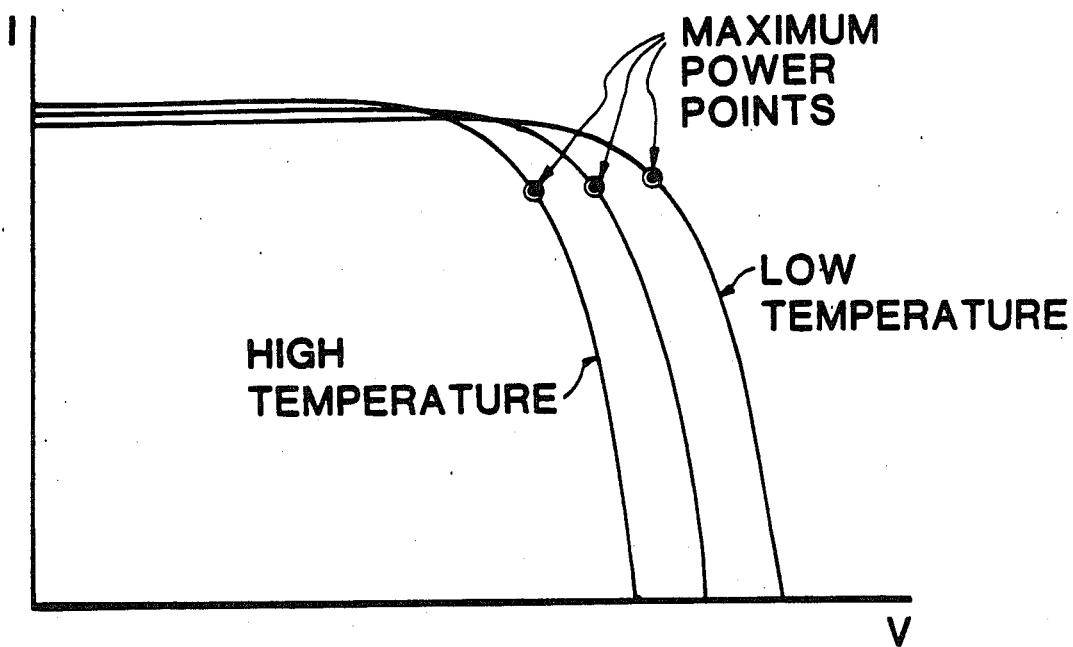
FIG. 1 is a graph showing current versus voltage for a typical photovoltaic solar array.

FIG. 1 is a graph showing the output characteristic of a typical solar photovoltaic array for various temperatures. The maximum power points are shown on the curves; they are the points at which the product of the current and voltage is a maximum for each curve. It is noteworthy that over a wide range, the array behaves as a current source rather than as a voltage source, although in the region of the maximum power point, the behavior of the array would have to be described as that of a quasi-constant current source.

In contrast to a battery, as light falls on a photovoltaic solar array, current is generated continuously in the array. If, as in certain prior art systems, that current cannot be utilized continuously, then either storage apparatus must be provided or some of the current will be wasted.

As a result of this characteristic of a typical solar photovoltaic array, prior art inverter designs that treat the power source as a constant voltage source are not appropriate for use with this type of solar cell. In particular, those prior art inverters in which various series combinations of batteries are produced by switching, and in which the voltages of the batteries are added, cannot be successfully used with power sources consisting of photovoltaic solar arrays.

Figure 2:
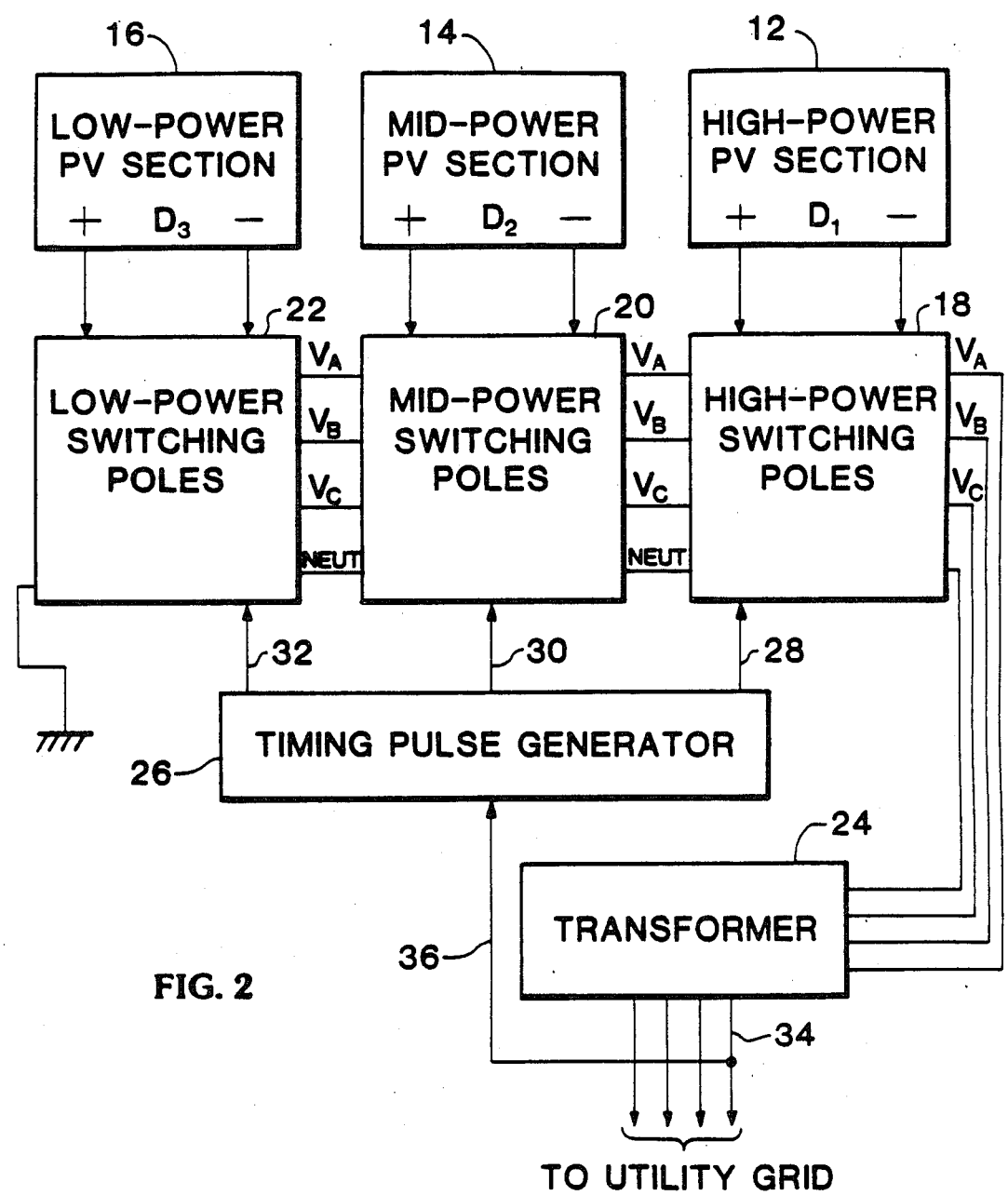
FIG. 2 is a block diagram showing the first embodiment connected to supply power to a utility grid.

Turning now to the drawings, in which like parts are denoted by the same reference numeral, there is shown in FIG. 2 a block diagram of a first embodiment of the present invention. Direct current generated by the arrays 12, 14, and 16 is applied to the switching poles 18, 20, 22 respectively. These poles, shown in detail in FIG. 5, connect the applied direct current to the three lines $V_A$, $V_B$ and $V_C$ sequentially, under control of control signals generated on the lines 28, 30, 32 by the timing pulse generator 26, which is shown in greater detail in FIG. 3.

Figure 6:
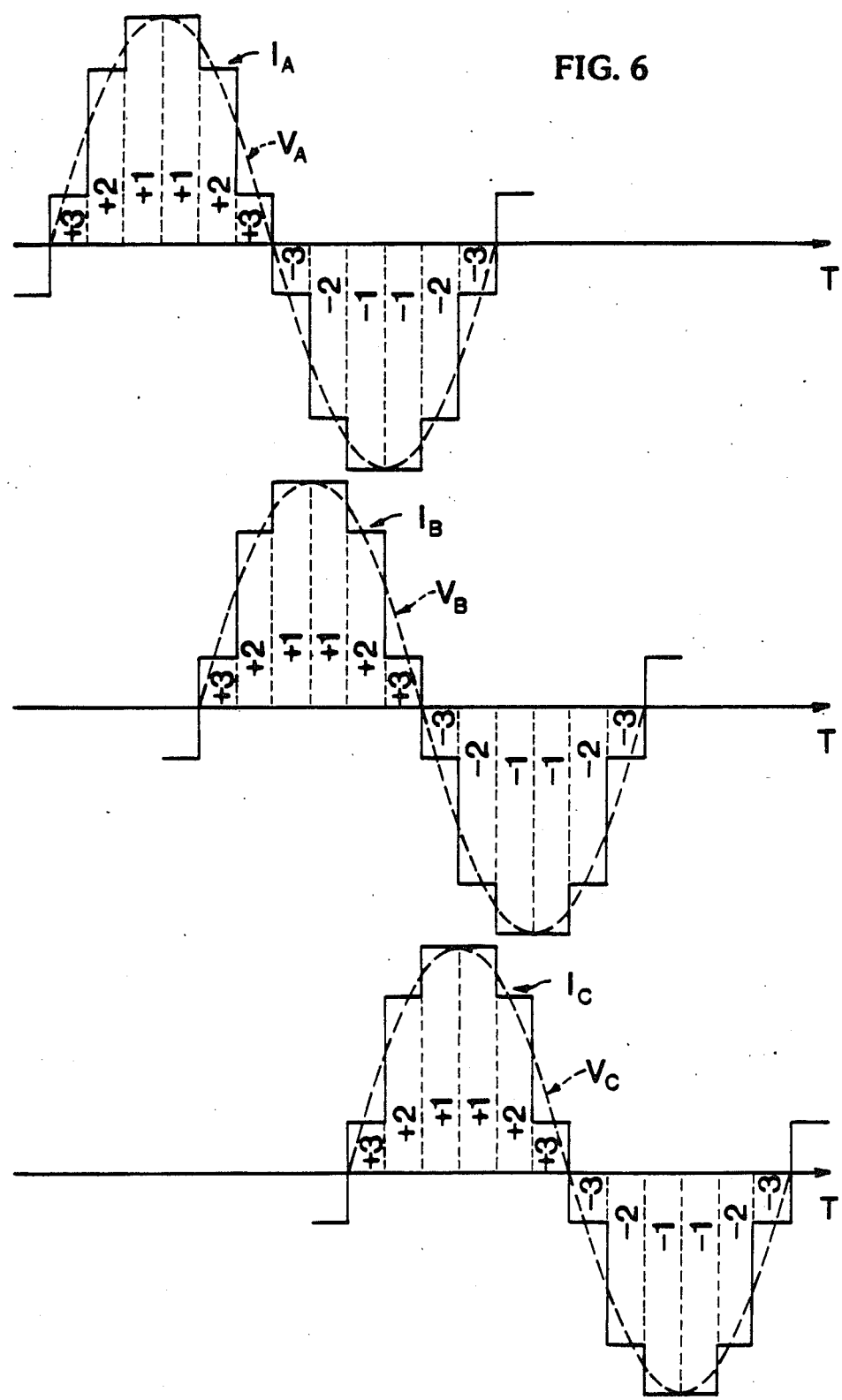
FIG. 6 is a graph showing how each solar array contributes to the three phases of the output in the first embodiment.

As will be seen below, at any particular instant, no two of the arrays 12, 14, 16 are supplying current to the same line, and also, at any particular instant, the current generated by each of the arrays is applied to some one of the lines $V_A$, $V_B$ and $V_C$. As a result of this switching action, which will be described more thoroughly below, a three-phase alternating current is generated on the output lines. In each phase, the waveform of the current approximates a sine wave, as shown in FIG. 6.

The output on the lines $V_A$, $V_B$ and $V_C$ may be useable for many applications. One particular application is shown in FIG. 2, in which the power generated by the arrays is fed into a utility grid, and thus may be sold to the utility company. In that application, a transformer 24 is used to convert the voltages on the lines $V_A$, $V_B$, and $V_C$ to voltages that are compatible with those used by the utility grid.

Figure 3:
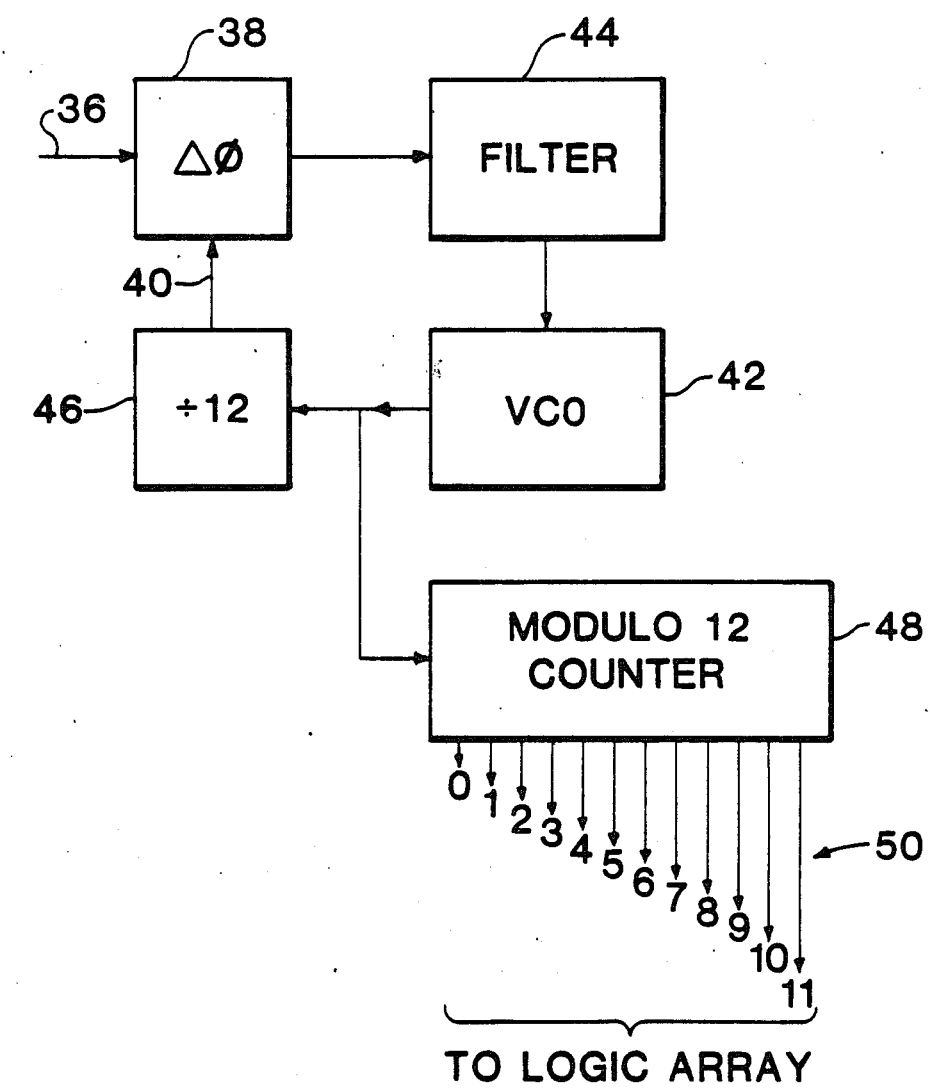
FIG. 3 is a block diagram of a timing pulse generator used in the first embodiment.

In this application, it is also necessary to synchronize the phase of the generated electric current with the voltage of the utility grid. For that purpose, the line 34 is connected via the line 36 to the timing pulse generator 26, so that the phase of the line 34 may be used as a reference by the timing pulse generator 26 in generating the control signals. FIG. 3 shows one embodiment of the timing pulse generator 26.

The quasi-sinusoidal waveform on the line 36 is applied to the phase difference sensing circuit 38 which also receives an alternating wave on the line 40. The circuit 38 senses the time difference in the applied signals and applies the difference signal to the filter 44 which serves to remove transients from the difference signal. The filtered difference signal is applied to the voltage controlled oscillator 42 to control its frequency. The oscillator 42 operates at approximately 12 times the frequency of the line voltage on the line 36. The output of the oscillator 42 is used to operate a mod 12 counter 48 that generates on the lines 50 the timing signals shown in FIG. 4. The output of the oscillator 42 is also fed to the divide-by-12 circuit 46 which produces an alternating wave on the line 40 whose frequency is one twelfth that of the oscillator 42. In this manner, the control signals on the lines 50 are generated in synchronism with the voltage of the utility grid.

In applications other than supplying current to a utility grid, the control signals can be generated by replacing the oscillator 42 by a clock, and dispensing with components 36, 38, 40, 44, and 46 of FIG. 3. The frequency of the clock should be 12 times the desired frequency of the power output of the system.

Figure 4:
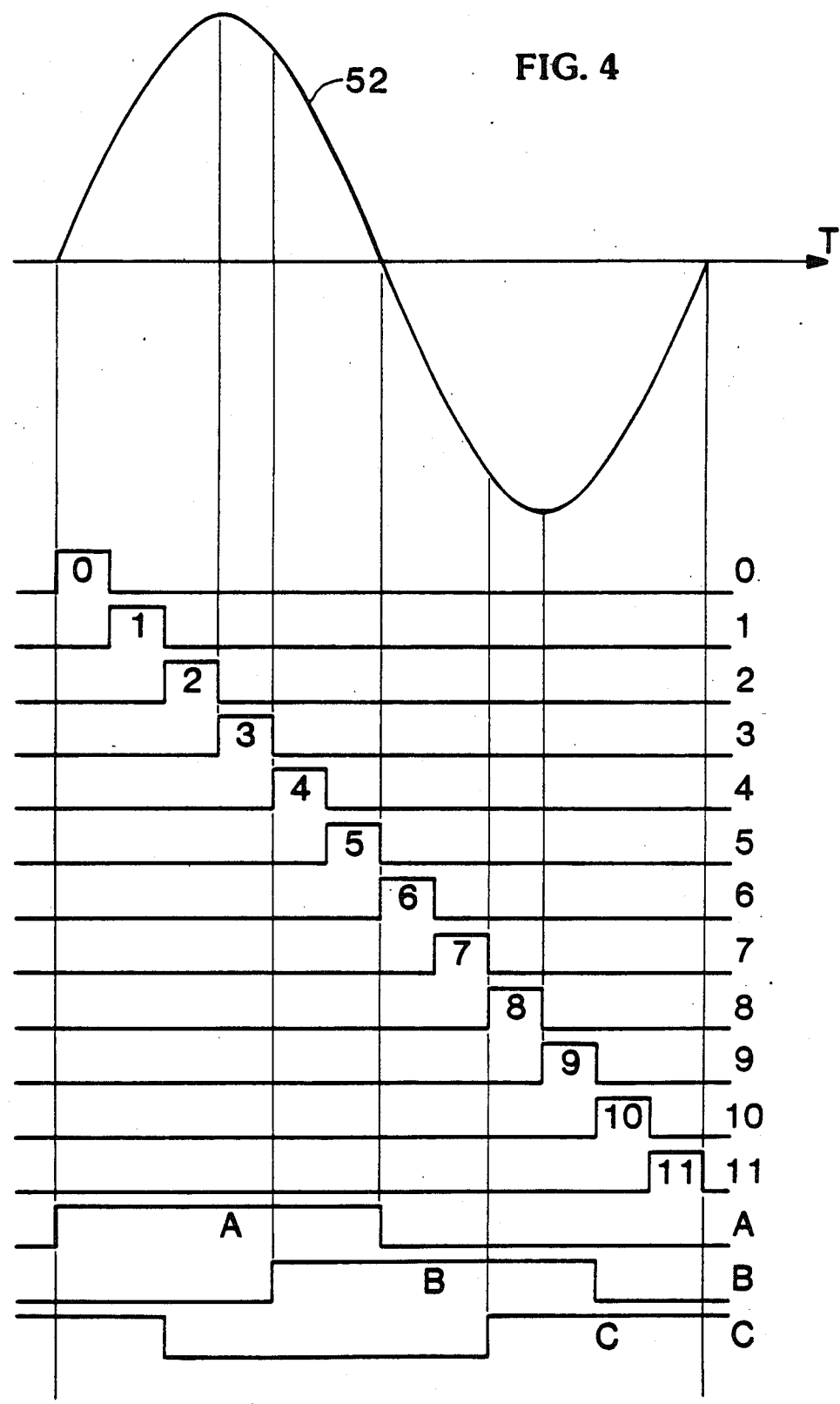
FIG. 4 is a graph showing certain logical control signals generated within the inverter in the first embodiment.

As shown in FIG. 4, the waveform 52 is the waveform on the line 36, or in any case, is the waveform to be approximated by the system of the present invention. The signals 0, 1, 2 . . . 11 are the signals on the corresponding lines 50 of FIG. 3. Each of these signals has a duration of 30 electrical degrees. The signals A, B, and C shown at the bottom of FIG. 4 are formed from the line voltages and are applied to a logic array to which the signals 0–11 are also applied. The logic array is not shown as its design would be straightforward to one skilled in the art. The logic array produces the logic control signals that are applied to the switching poles in FIG. 5. By way of example, the switching control signal $\overline{A} \cdot (8+9)$ is a signal that is generated only when the signal A is not present and either the signal 8 or the signal 9 is present. Thus, the signals applied to the switching poles in FIG. 5 can be produced by appropriate combinations of OR and AND gates, or other logic circuits.

FIG. 5 shows the arrays 12, 14, 16 connected into the high power switching poles 18, the mid-power switching poles 20 and the low-power switching poles 22 respectively. The 24 switches shown in FIG. 5 are operated under control of the logic signals indicated. These are the logic signals that have been produced through logical combination of the signals shown in FIG. 4. Each of the switching poles has four terminals which are designated, for example, as G1, A1, B1, and C1. The signals G1, G2, and G3 (and their absence) determines which side of each array is grounded or connected to the neutral line. The output of the array $D_1$ is presented at one of the three terminals A1, B1, and C1. The terminals A1, A2, and A3 are all connected to the line through which the current of phase A is supplied. Likewise, the terminals B1, B2, and B3 are all connected to the line through which the current of phase B flows.

When the switching poles of FIG. 5 are operated under control of the signals shown in FIG. 4, the result shown in FIG. 6 necessarily follows. The solid waveforms in FIG. 6 represent the actual current flow in each of the three output phases, and the dashed sinusoids show the voltages in the three phases of the utility grid. The numbers along the time axis indicate which of the three arrays $D_1$, $D_2$, or $D_3$ is feeding a particular phase at any particular instant. The sequence $+3$, $+2$, $+1$, $+1$, $+2$, $+3$, indicates that the array $D_3$ feeds a particular phase for the first 30° of each cycle, and then the array $D_2$ feeds that phase for the next 30° of the cycle, and then the array $D_1$ feeds the phase for the next two 30° intervals, etc. In the second half of each cycle, the sequence is the same but the polarity is reversed.

A close inspection of FIG. 6 will reveal that at any particular instant of time, all three arrays are being used, but on different phases. It can also be seen that the current generated by each array is used 100% of the time, although it is switched from one phase to another.

Figure 7:
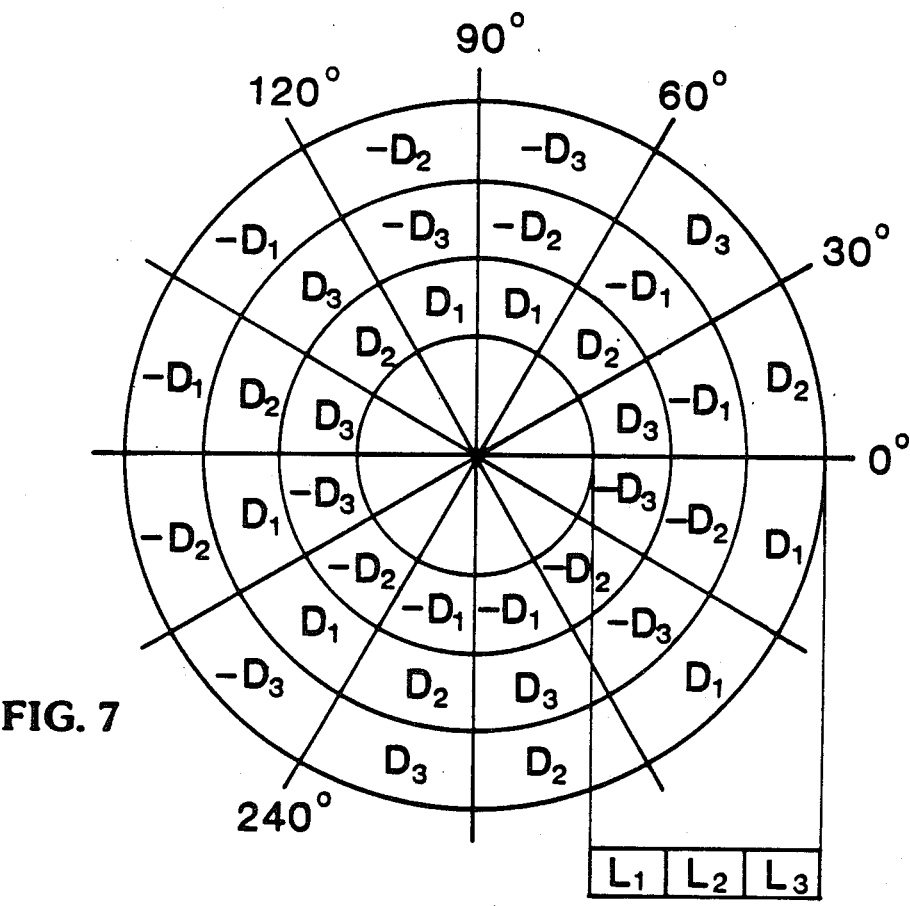
FIG. 7 is a diagram showing when three arrays are connected to the output lines during each cycle in the first embodiment.

These relationships may be comprehended more easily by reference to FIG. 7, in which the inner ring shows which arrays are connected to the line $L_1$ of phase A, the middle ring shows which arrays are connected to the line $L_2$ of phase B, and the outer ring shows which arrays are connected to the line $L_3$ of phase C. FIG. 7 may be thought of as the layout of a commutator, and suggests that the switching may be accomplished by commutation.

An important aspect of the invention is the use of arrays having specific current and voltage values so chosen that in operation current close to that of the maximum power point for each array will flow essentially continuously from each array into the system.

The sizing of the arrays can be calulated in terms of the angle of the sine wave over which conduction from the array occurs. Let $F_i(\theta_1, \theta_2)$ denote that fraction of the power P of the combined arrays that permits array i to operate close to its maximum power point when conducting between the angles $\theta_1$ and $\theta_2$. Only angles between 0° and 90° need be considered because the pattern of that interval repeats four times during a complete cycle of the sine wave. Assuming the sinusoidal current, $I(\theta)$ is in phase with the sinusoidal voltage, $V(\theta)$, then $$V(\theta) = V \sin \theta$$

$$I(\theta) = I \sin \theta$$

the instantaneous power, $P(\theta)$ is, $$P(\theta) = V(\theta) \cdot I(\theta)$$

and the average power P is, $$P = \frac{1}{2\pi} \int_0^{2\pi} V(\theta) \cdot I(\theta) d\theta = \frac{VI}{2}$$

However, if an array conducts from $\theta_1$ to $\theta_2$ in each successive 90° portion of the sine wave, then the power delivered from that array to that individual phase $P_1$ is, $$P_i = \frac{2}{\pi} \int_{\theta_1}^{\theta_2} VI \sin^2\theta d\theta = \frac{2}{\pi} V \cdot I \left[ \frac{1}{2} \theta - \frac{1}{4} \sin 2\theta \right]_{\theta_1}^{\theta_2}$$

and the fraction, $F_i(\theta_1, \theta_2)$ is, $$\frac{P_i}{P} = \frac{2}{\pi} (\theta_2 - \theta_1) - \frac{1}{\pi} [\sin 2\theta_2 - \sin 2\theta_1]$$

Evaluating this expression for the first embodiment yields the following table:

| ARRAY | $\theta_1$ | $\theta_2$ | $F_i(\theta_1, \theta_2)$ |
|---|---|---|---|
| 1. High Power | 60° | 90° | 0.609 |
| 2. Medium Power | 30° | 60° | 0.333 |
| 3. Low Power | 0° | 30° | 0.058 |

Thus the arrays will be sized to provide approximately 61%, 33% and 6% of the total power.

Figure 8:
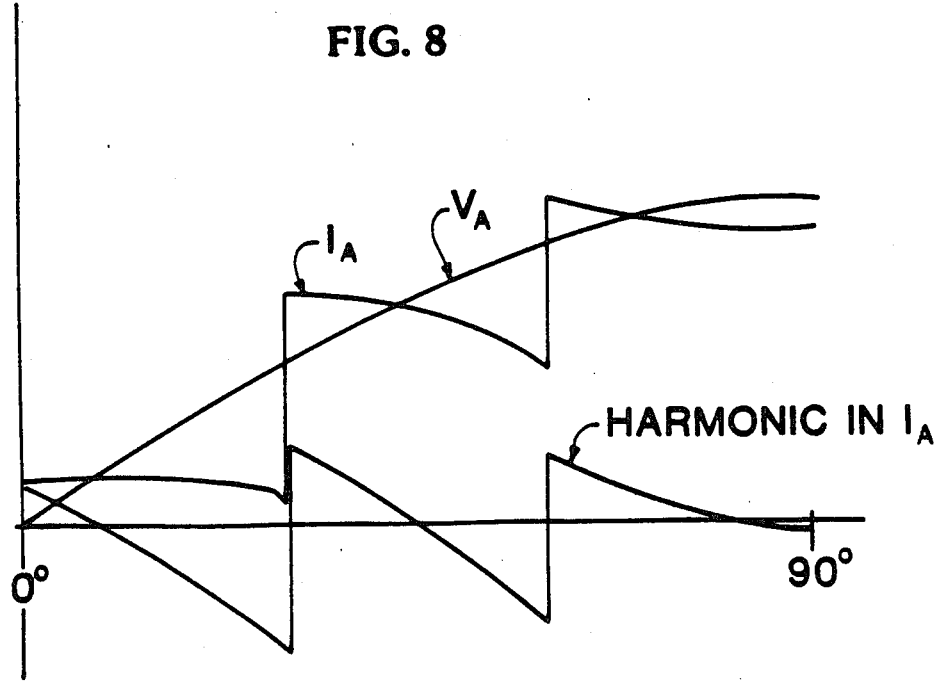
FIG. 8 is a graph showing the current supplied to one phase during the first 90° of a cycle, in the first embodiment.

When the arrays have been sized in this proportion, the graph of FIG. 8 shows the degree to which the sinusoidal curve is approximated. The departures from the sinusoidal curve are also shown in FIG. 8, and they represent the combined contribution of all of the harmonics. The graphs shown in FIG. 8 result from computer simulations and indicate that as much as 95% of the power available from the solar arrays is utilized by the inverter.

One conclusion that can be drawn from the graph of FIG. 8 as well as from the table above is that the low power array contributes only a very small percentage of the total output power. This suggests the possibility of eliminating the low power array $D_3$.

Figure 9:
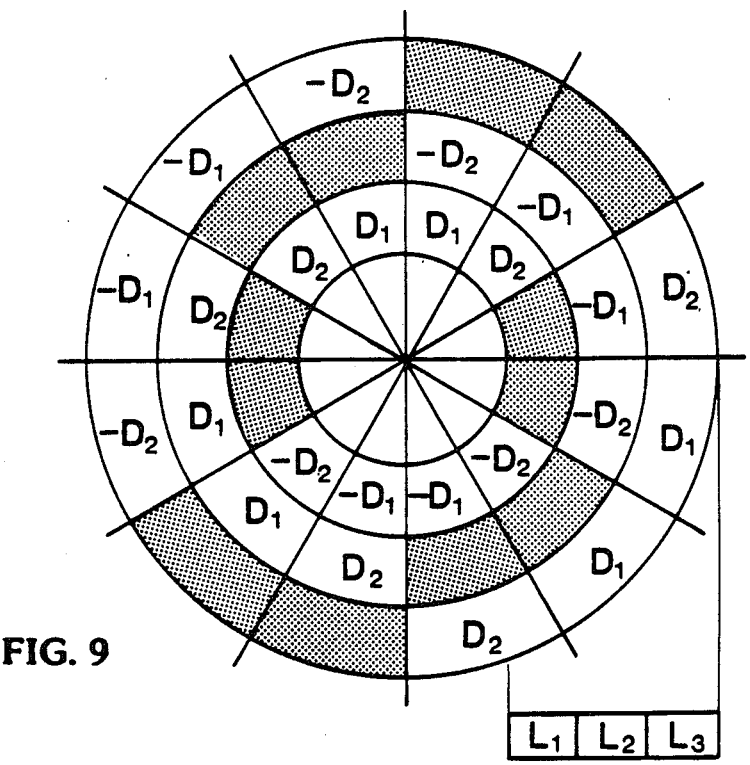
FIG. 9 is a diagram showing when two arrays are connected to the output lines during each cycle, in the first embodiment.

FIG. 9 is a diagram that shows how the high power and medium power arrays $D_1$ and $D_2$ should be connected to the phases in accordance with the present invention. It is noteworthy that each of the remaining two phases is used 100% of the time and that at any particular instant, a particular phase is being fed by no more than one array.

Figure 10:
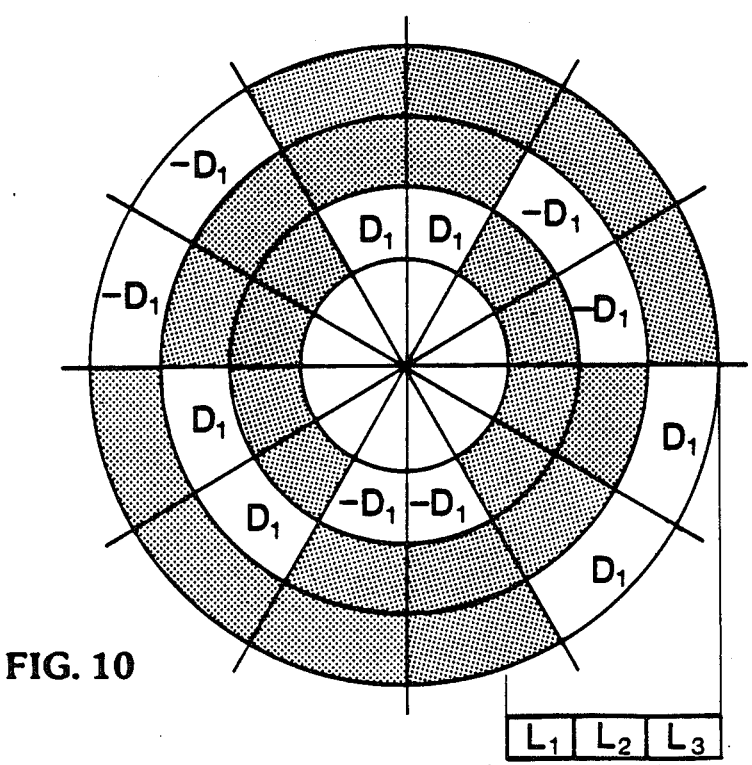
FIG. 10 is a diagram showing when a single array is connected to the output lines during each cycle, in the first embodiment.

FIG. 10 is a diagram showing what can be done if both the low power array $D_3$ and the medium power array $D_2$ are eliminated, leaving only the high power array $D_1$. Again, it should be noted that the remaining array $D_1$ is used 100% of the time, and at any particular instant each of the three phases is fed by no more than one array. The embodiments of FIGS. 9 and 10 are considered to be within the scope of the invention.

Figure 11:
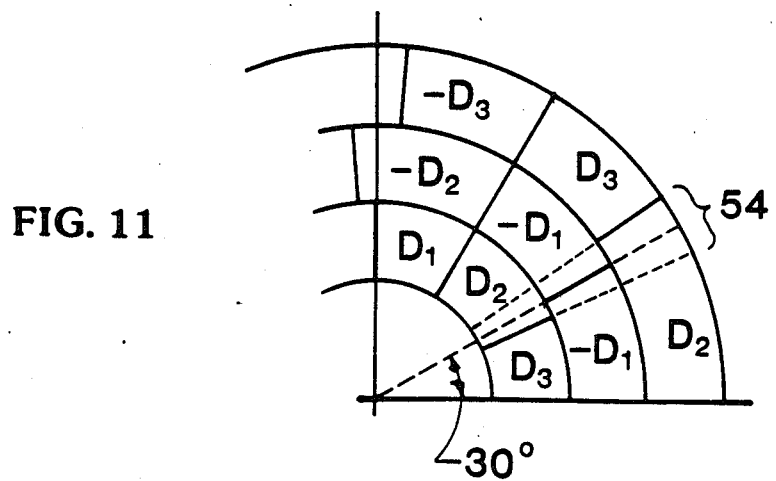
FIG. 11 is a diagram showing the effects of altering the length of time an array feeds an output line in the first embodiment.

FIG. 11 is a fractional view of a diagram comparable to that of FIG. 7, and is included to show the undesirability of departing from the angles used in FIG. 7. It will be recalled that in FIG. 7, there were three phases and therefore the first quadrant was divided into three intervals of 30° each. In the example of FIG. 11, the interval for $D_3$ has been shortened, thereby permitting the interval for $D_2$ to be increased. When these changes have been made, as shown in FIG. 11, two problems arise. In the interval 54, it appears that the medium power array $D_2$ must supply power to both the first and the third phases. Further, during the interval 54, the low power array $D_3$ is not supplying power to any of the phases and therefore is not used 100% of the time. Thus, it can be seen that there is merit in the procedure of dividing the first quadrant into as many equal intervals as there are phases.

For the first phase, the sequencing that occurs in the first quadrant determines the entire diagram. This is because the sequence in the second quadrant is determined by folding about the vertical axis, and then the sequence for the third and fourth quadrants is determined by folding about the horizontal axis. Thereafter, the sequencing of the second phase is determined by repeating the sequence of the first phase after it has been rotated through an angle equal to 360°/N where N is the number of phases. In general, the kth phase is determined by rotating the sequence of the first phase through an angle equal to (k−1) 360°/N.

If there are an even number of phases, then the phase whose ordinal number is 1+(N/2) will start at an angle of 180°, and consequently, the sequence in the first quadrant for that phase will be identical to the sequence of the first phase, except for a reversal of algebraic sign. In that case it would appear that each array would be required simultaneously to feed a positive current into the first phase and a negative current of the same magnitude into the 1+(N/2) th phase. Clearly, this is impossible for a single array. However, the present inventor has found that if pairs of arrays are used, the problem becomes tractable. Further, the present inventor has found that the use of pairs of arrays permits a highly desirable objective to be attained, namely, the individual arrays can be grounded. A system incorporating these features is shown in FIG. 12.

The system of FIG. 12 generates the six phases of a grounded double-wye system, and those phases are denoted as $V_A$, $V_B$, $V_C$, $V_A$, $V_B$, and $V_C$. There is provided a pair 56, 58 of high power arrays denoted as $D_1$, $D_1'$, a pair of mid-power arrays 60, 62 denoted as $D_2$, $D_2'$, and a pair 64, 66 of low power arrays denoted as $D_3$, $D_3'$. Each of these six arrays has a positive terminal and a negative terminal. The negative terminals of the arrays 56, 60, 64 are connected to ground, and also the positive terminals of the arrays 58, 62, 66 are connected to ground.

Figure 13:
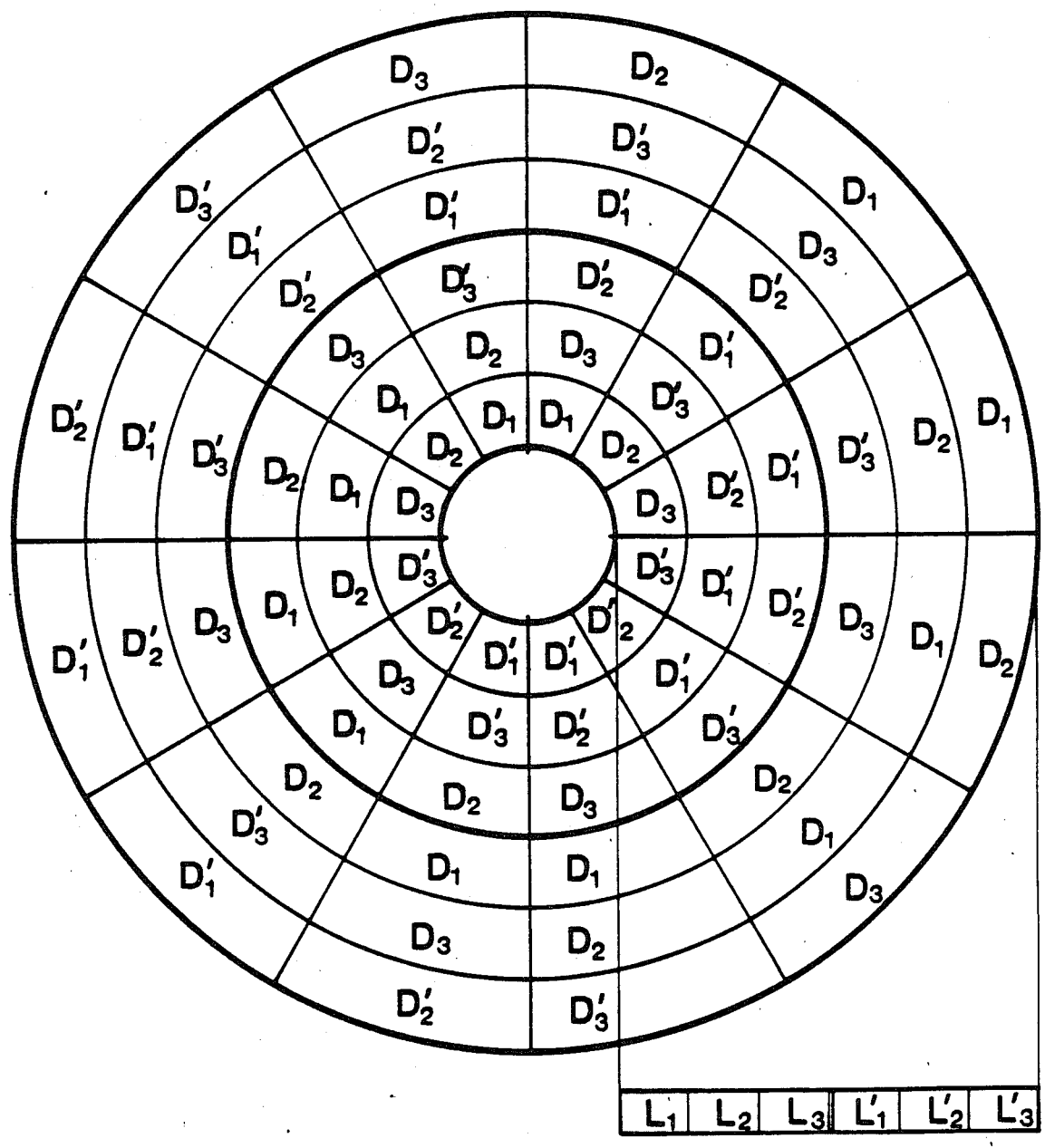
FIG. 13 is a diagram showing when the arrays are connected to various lines in the preferred embodiment.

FIG. 13 is a diagram that shows when each of the arrays is connected to a particular one of the lines $L_1$, $L_2$, $L_3$, $L_1'$, $L_2'$, and $L_3'$. A comparison of FIG. 13 with FIG. 7 reveals that the phases $L_1$, $L_3$ and $L_2'$ of FIG. 13 are identical to the phases $L_1$, $L_2$ and $L_3$ respectively of FIG. 7. Also, the phases $L_1$, $L_2$ and $L_3$ of FIG. 7 are identical with, but 180° out of phase with, the phases $L_1'$, $L_3'$, and $L_2$ of FIG. 13, respectively. Thus, the inverter 68 of FIGS. 12 and 13 is equivalent to two of the inverters of FIG. 5 operating at a phase displacement of 180°. Accordingly, the design of the inverter 68 of FIG. 12 could be deduced from that of the inverter of FIG. 5.

Reverting briefly to FIG. 13, it is noteworthy that each of the six arrays is utilized 100% of the time and also, at any particular instant no more than one of the six arrays is feeding a particular phase. Also, in a first alternative embodiment, the low power arrays 64, 66 may be eliminated, as was done in connection with FIG. 9. In a second alternative embodiment, both the mid power arrays 60, 62 as well as the low power arrays 64, 66 may be disconnected, as was done in connection with the diagram of FIG. 10.

FIG. 14 is a circuit diagram, comparable to the circuit of FIG. 5 and showing the switching poles and their control signals for the inverter 68 of FIG. 12. The control signals and the circuit for generating them are similar to those shown in FIGS. 3 and 4, and described above.

In a logical extension of the preferred embodiment six pairs of arrays are used to produce a 12-phase alternating current. The interval from 0° to 90° is divided into six equal parts of 15° each. By use of the equation developed above, the relative sizes of the arrays are determined to be:

| ARRAY | $\theta_1$ | $\theta_2$ | $F_i(\theta_1, \theta_2)$ |
|---|---|---|---|
| 1 | 75° | 90° | 0.326 |
| 2 | 60° | 75° | 0.283 |
| 3 | 45° | 60° | 0.209 |
| 4 | 30° | 45° | 0.124 |
| 5 | 15° | 30° | 0.050 |
| 6 | 0° | 15° | 0.007 |

The design approach utilized in the first embodiment described above and shown in FIGS. 2–7 can be generalized to the case where there are produced N phases, $V_A$, $V_B$, $V_C$ ... $V_N$, where N is an odd number and where there are M arrays, listed in order of decreasing output voltage as $D_1$, $D_2$ ... $D_i$ ... $D_M$. The N phases are produced respectively on the N lines $L_1$, $L_2$, ... $L_k$ ... $L_N$ As discussed above, the interval 0°–90° for the first phase determines the entire sequencing scheme; and, the interval 0°–90° should, in accordance with the invention, be divided into N intervals each of duration 90°/N. Also, as indicated above, the array $D_1$ with the highest voltage should be assigned to the interval nearest 90°, the array $D_2$ with the second highest voltage should be assigned to the interval nearest (of the remaining intervals) to 90°, etc. Thus, the array $D_1$ is assigned to the interval of duration 90°/N that begins at $$90° - 1 \cdot \frac{90°}{N};$$

the array $D_2$ is assigned to the interval that begins at $$90° - 2 \cdot \frac{90°}{N};$$

and in general the array $D_i$ is assigned to the interval that begins at $$90° - i \frac{90°}{N},$$

which equals $$90°\left(1 - \frac{i}{N}\right).$$

As discussed above, the sequence from 0°–90° is repeated in reverse order in the interval from 90° to 180°. In that quadrant, the array $D_i$ is assigned to the interval beginning at $$90°\left(1 + \frac{i-1}{N}\right).$$

Also, the sequence from 0° to 180° is repeated, with reversed polarity, in the interval 180° to 360°. In the third and fourth quadrants the array $D_i$ is assigned to the intervals beginning at, respectively, $$90°\left(3 - \frac{i}{N}\right) \text{ and } 90°\left(3 + \frac{i-1}{N}\right).$$

Thus far, all of the assignments have been in the first phase, which is assumed to begin at 0°. The beginning points of the other phases are displaced from 0° by multiples of 360°/N. Thus, the second phase is advanced from the first phase by $$1 \cdot \frac{360°}{N};$$

the third phase is advanced from the first phase by $$2 \cdot \frac{360°}{N};$$

and in general, the kth phase is advanced from the first phase by $$(k - 1)\frac{360°}{N}.$$

At this point, the entire assignment scheme is determined, since the intervals assigned in any phase (k) can be determined from the intervals assigned in the first phase merely by adding the rotational advancement appropriate to that phase.

Thus, in its greatest generality, the first embodiment of FIGS. 2–7 amounts to connecting the array $D_i$ to the line $L_k$ of the kth phase in a positive sense for an interval of duration 90°/N beginning at $$90°\left(1 - \frac{i}{N}\right) + (k - 1)\frac{360°}{N} \text{ and again at}$$

$$90°\left(1 + \frac{i-1}{N}\right) + (k - 1)\frac{360°}{N}$$

and connecting the same array $D_i$ to the same line $L_k$ in a negative sense for an interval of duration 90°/N beginning at $$90°\left(3 - \frac{i}{N}\right) + (k - 1)\frac{360°}{N} \text{ and again at}$$

$$90°\left(3 + \frac{i-1}{N}\right) + (k - 1)\frac{360°}{N}$$

for all combinations of $1 \leq i \leq m$ and $1 \leq k \leq N$, N being an odd number.

From the above expressions it can be proven analytically that each array is utilized 100% of the time, and that at any particular instant, no more than one array feeds a particular phase.

In the above equations, 0° is the instant of the positive-going zero crossing of the current being generated in the first phase. When the inverter is connected to a utility grid, it may be desirable to advance or retard the 0° phase of the inverter with respect to the positive-going zero crossing of the line voltage, by a constant angle δ, to compensate for the non-ideal nature of the switching poles. This has the effect of rotating the diagrams of FIGS. 7, 9, 10, and 13 through the angle δ with respect to the line voltage, but does not otherwise affect the sequencing of the switching or the operation of the inverter. Clearly, the present invention comprehends this case, in which a constant angle δ is added to each of the angles defined by the above expressions.

The preferred embodiment of FIGS. 12–14 makes use of pairs of arrays, and therefore always employs an even number of arrays. That embodiment must be employed when N is an even number.

Figure 15:
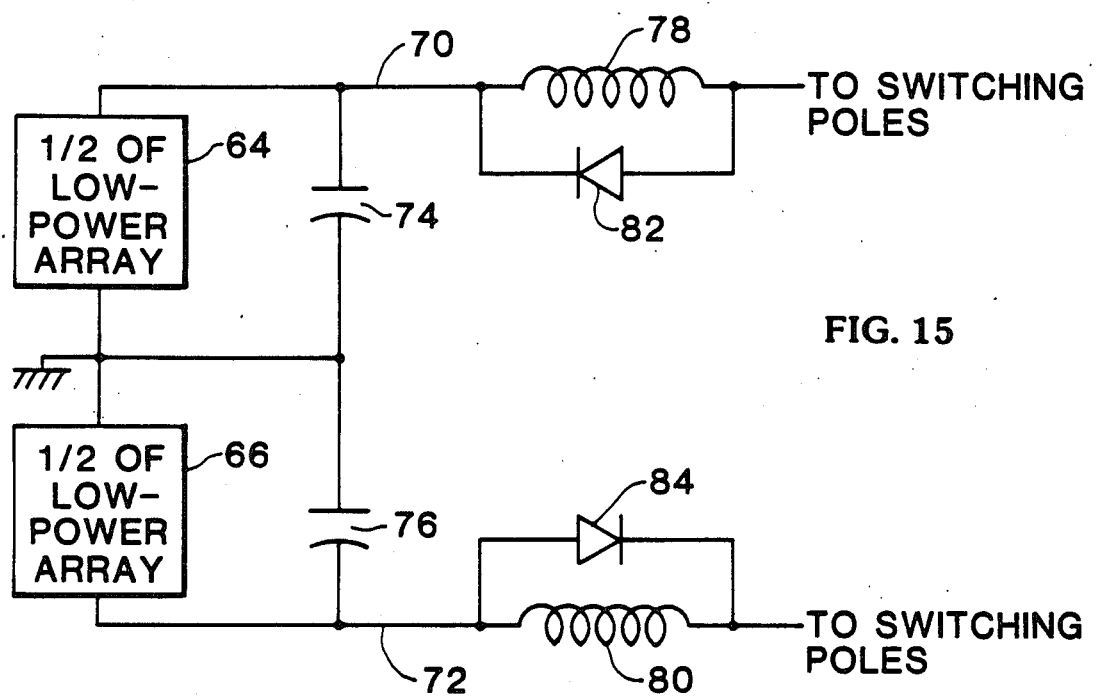
FIG. 15 is a circuit diagram showing an optional refinement applicable to the preferred embodiment.

FIG. 15 shows an optional modification that can be made to the preferred embodiment. The modification affects the manner in which the low power arrays 64, 66 are connected to the switching poles. Because only the low power arrays are involved, the cost of the components is relatively small. A capacitor 74 is connected across the array 64 and a capacitor 76 is connected across the array 66. An inductor 78 is connected in the line 70 between the positive terminal of the array 64 and the low power switching pole. Also, an inductor 80 is connected in the line 72 between the negative terminal of the array 66 and its low power switching pole. Diode clamps 82, 84 across the inductors 78, 80 respectively prevent voltage surges when switch operation is interrupted.

In operation, the capacitors 74, 76 and the inductors 78, 80 are sized so that the array is held close to its maximum power point while supplying current alternatively to the capacitors and the inductors. The inductor provides a quasi-linear current ramp, first increasing then decreasing as the array section is switched from one phase to another. The linear ramp closely matches the desired portion of the sine wave output current at voltages close to the zero crossing. The array is operated much closer to its maximum-power voltage with this circuit. Where very high utilization is required, this modification may also be applied to the medium power array sections 60, 62.

A practical question is the extent to which departures from the design are allowable. For example, as discussed above, the three arrays used in the first embodiment should ideally be configured to deliver approximately 61%, 33% and 6%, respectively of the total output power. However, practical considerations, such as the finite size of the individual cells in the array, may necessitate departures from these ideal quantities.

Figure 16:
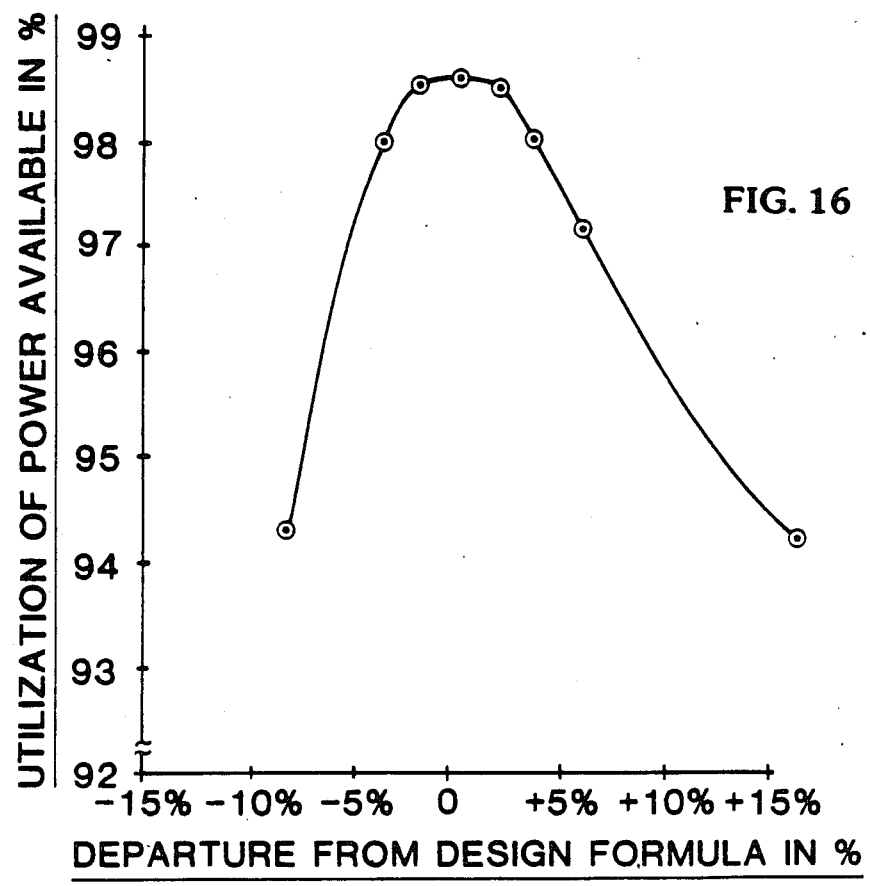
FIG. 16 is a graph showing utilization of the available power as a function of departure from the design formula for the preferred embodiment.

The present inventor has undertaken a study to determine how the utilization of available power is affected by departures from the ideal design parameters. The results are shown in FIG. 16, which shows that a rather broad optimum exists within plus and minus 10% of the ideal configuration. The graph of FIG. 16 is based on the assumption of uniform departures for all of the arrays in the system. Of these, departures in the highest power array have the greatest effect.

Figure 17:
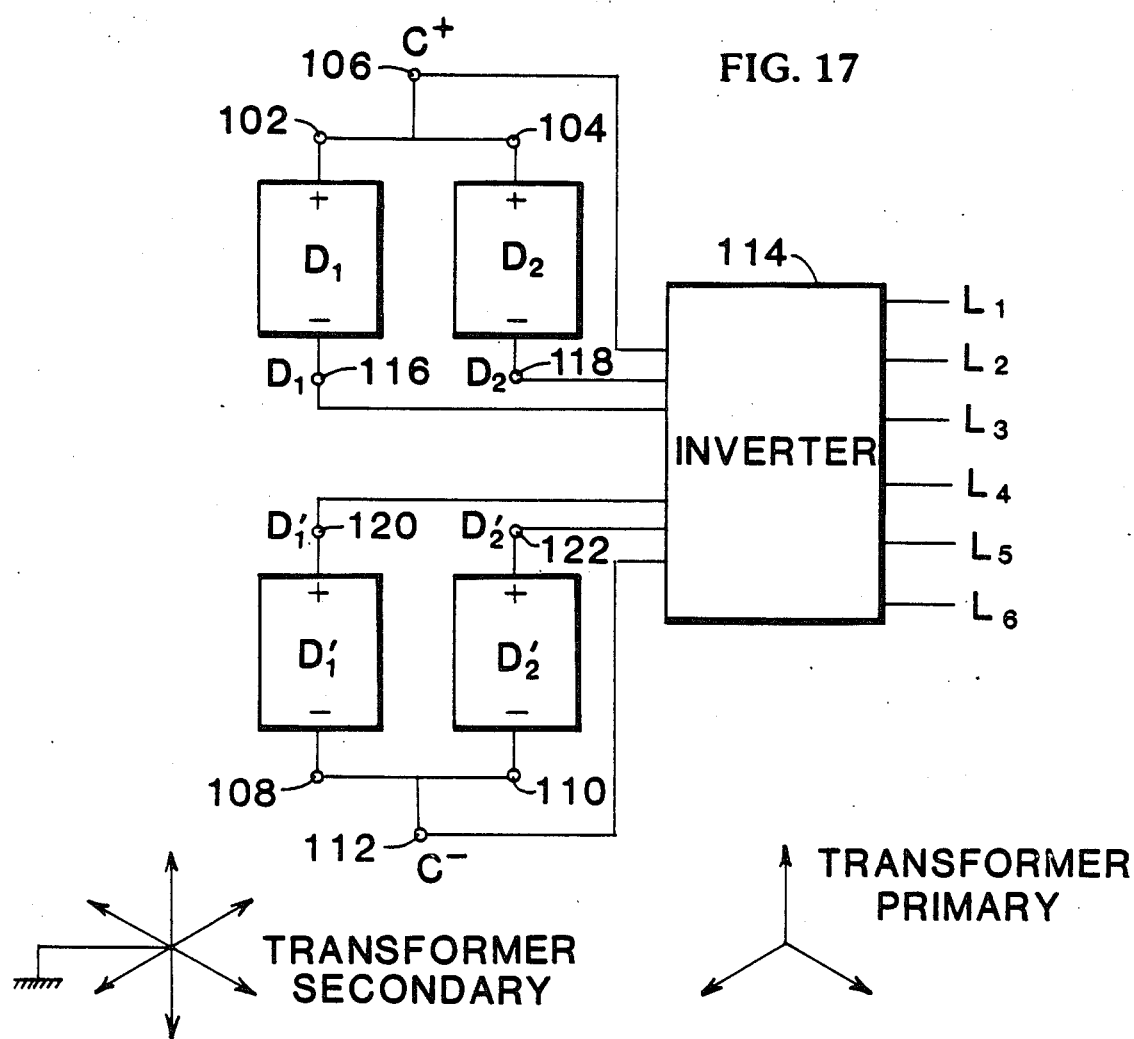
FIG. 17 is a block diagram showing a second preferred embodiment of the present invention.

FIG. 17 shows a second preferred embodiment of the present invention which permits extremely high utilization of the arrays, as will be discussed below. This embodiment includes two high power arrays $D_1$ and $D_1'$ which are sized to provide 82% of the dc power, and further includes two low power arrays $D_2$ and $D_2'$ which supply the remaining 18% of the dc power.

The positive terminals 102 and 104 of the arrays $D_1$ and $D_2$, respectively, are connected to a common positive terminal 106, denoted as $C^+$.

Likewise, the negative terminals 108 and 110 of the arrays $D_1'$ and $D_2'$, respectively, are connected to a common negative terminal 112, denoted as $C^-$.

Figure 18:
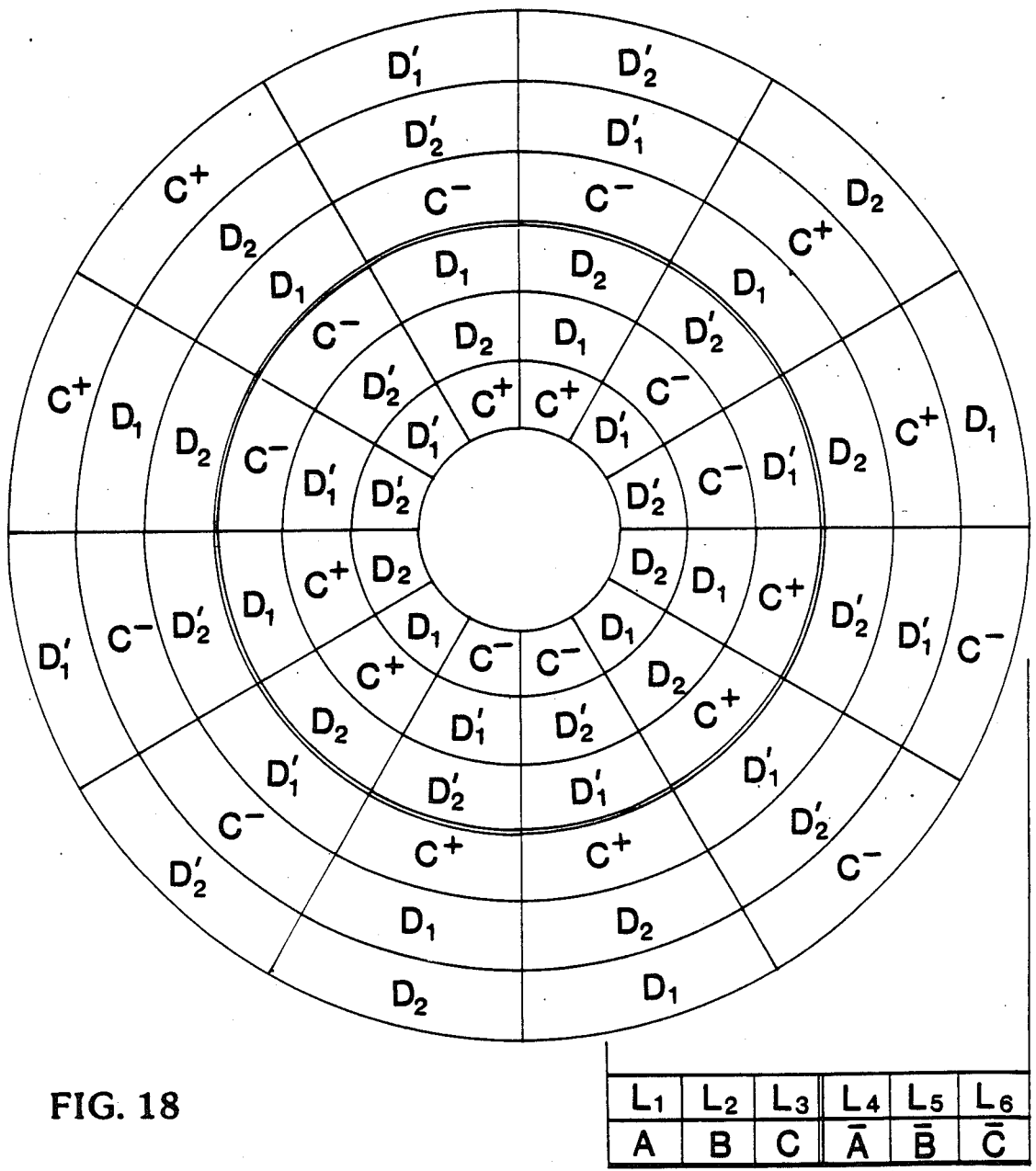
FIG. 18 is a diagram showing when and how the arrays of FIG. 17 are connected to the output lines during each cycle; and, FIG. 19 is a graph showing all six phases of the output of the embodiment of FIG. 17 versus phase, and showing how each phase is constituted of contributions from the arrays.

The terminals 102, 104, 106, 108, 110 and 112 are connected to the inverter 114 which interconnects the terminals to the lines $L_1$ through $L_6$ in accordance with the scheme shown in FIG. 18.

In FIG. 18, the letters $C^+$, $C^-$, $D_1$, $D_2$, $D_1'$ and $D_2'$ denote the terminals 106, 112, 116, 118, 120 and 122 of FIG. 17, respectively. Also in FIG. 18, the letters A, B and C denote three phases of ac output which are 120° apart in phase, while the letters $\overline{A}$, $\overline{B}$ and $\overline{C}$ denote another three output phases which are in opposition, respectively, to the first three phases.

Referring to FIG. 18 it can be seen that the A phase on line $L_1$ of the output is constructed by connecting the terminal $D_2'$ to $L_1$ for the first 30° of phase, then connecting the terminal $D_1'$ to $L_1$ for the second 30° of phase, then connecting the terminal $C^+$ to $L_1$ for the third and fourth 30° intervals, etc. FIG. 18 gives a complete definition of the switching scheme of the second preferred embodiment.

Figure 19:
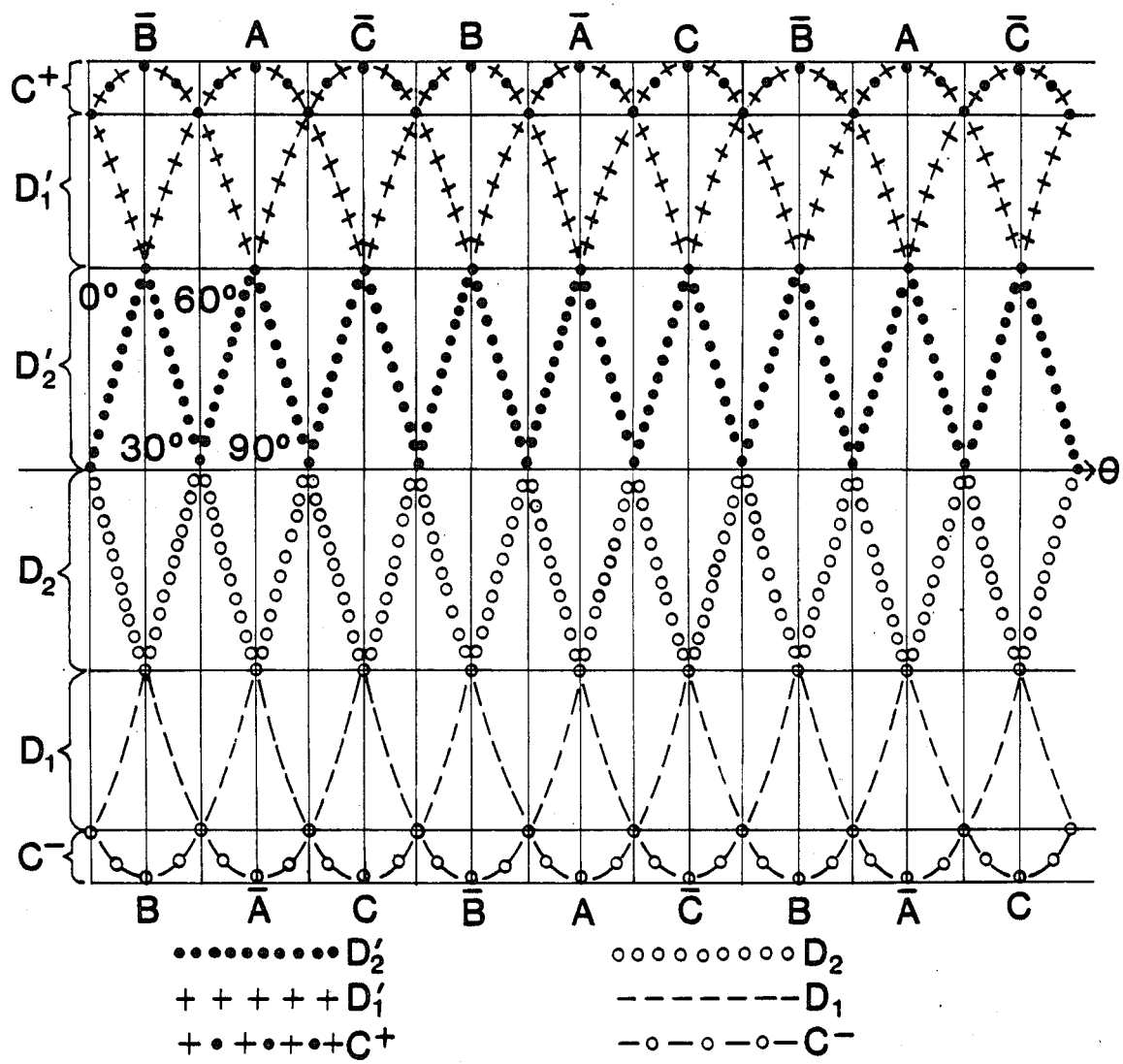

FIG. 19 is another way of presenting the information of FIG. 18. FIG. 19 permits the composition of each of the phases to be seen at a glance. In addition, FIG. 19 permits the voltage excursions of the various arrays to be seen.

As discussed above in connection with FIG. 1, the maximum power point for an array is the point on the operating characteristic curve at which the output power is maximized. The maximum power point is identified by a specific current at a specific voltage. For other values of current and voltage on the characteristic curve the output power is less than the maximum of which the array is capable, and the array is under-utilized. Ideally, the design of a system should strive to operate each array at its maximum power point. Practically, the design should minimize excursions from the maximum power point, to obtain maximum utilization.

The design of the second preferred embodiment does exactly that. The voltage excursions for the arrays are indicated at the left side of FIG. 19. It can be seen that the design permits the excursions of the high power panels, which supply 82% of the power, to be kept relatively small. Calculations indicate the utilization of the high power panels to be about 99%. The excursions of the low power panels, which supply 18% of the power, are larger, resulting in lower utilization. Nevertheless, the overall utilization for the system is around 98%, which is considered to be excellent at the present state of the art.

A secondary advantage of the second preferred embodiment is that it requires only two sizes of arrays.

Thus, there have been described several embodiments of an inverter for converting the output of a number of solar photovoltaic arrays into polyphase alternating current. The inverter is characterized by the fact that each array delivers current 100% of the time, and no energy storage devices are required.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A system for generating a six phase alternating current on the lines $L_1, L_2 \ldots L_6$, comprising in combination:
    a first high power array having a positive terminal and having a negative terminal denoted by $D_1$;
    a first low power array having a positive terminal and having a negative terminal denoted by $D_2$, the positive terminals of said first high power array and of said first low power array being connected to a common positive terminal denoted by $C^+$;
    a second high power array having a negative terminal and having a positive terminal denoted by $D_1'$;
    a second low power array having a negative terminal and having a positive terminal denoted by $D_2'$, the negative terminals of said second high power array and of said second low power array being connected to a common negative terminal denoted by $C^-$;
    switching means connected to the terminals $D_1$, $D_2$, $C^+$, $D_1'$, $D_2'$, and $C^-$ and connected to the lines $L_1, \ldots L_6$ for generating a first phase A on the line $L_1$ by
    (a) connecting $D_2'$ to $L_1$ for an interval of 30° starting at 0° and again at 150°
    (b) connecting $D_1'$ to $L_1$ for an interval of 30° starting at 30° and again at 120°
    (c) connecting $C^+$ to $L_1$ for an interval of 60° starting at 60°
    (d) connecting $D_2$ to $L_1$ for an interval of 30° starting at 180° and again at 330°
    (e) connecting $D_1$ to $L_1$ for an interval of 30° starting at 210° and again at 300°
    (f) connecting $C^-$ to $L_1$ for an interval of 60° starting at 240°, for generating a second phase B on the line $L_2$ by repeating steps (a) through (f) with $L_2$ substituted for $L_1$ and with 120° added to all of the starting phases, for generating a third phase C on the line $L_3$ by repeating steps (a) through (f) with $L_3$ substituted for $L_1$ and with 240° added to all of the starting phases, for generating a fourth phase $\overline{A}$ on the line $L_4$ by repeating steps (a) through (f) with $L_4$ substituted for $L_1$ and with 180° added to all of the starting phases, for generating a fifth phase $\overline{B}$ on the line $L_5$ by repeating steps (a) through (f) with $L_5$ substituted for $L_1$ and with 300° added to all of the starting phases, and for generating a sixth phase $\overline{C}$ on the line $L_6$ by repeating steps (a) through (f) with $L_6$ substituted for $L_1$ and with 420° added to all of the starting phases.

2. The system of claim 1 wherein said first and second high power arrays together supply approximately 82% of the dc power applied to said switching means, and wherein said first and second low power arrays together supply approximately 18% of the dc power applied to said switching means.

* * * * *